Sept. 19, 1961  L. W. VERNON ET AL  3,000,816
DESULFURIZATION WITH A MODIFIED MOLYBDENUM DISULFIDE CATALYST
Filed June 24, 1959
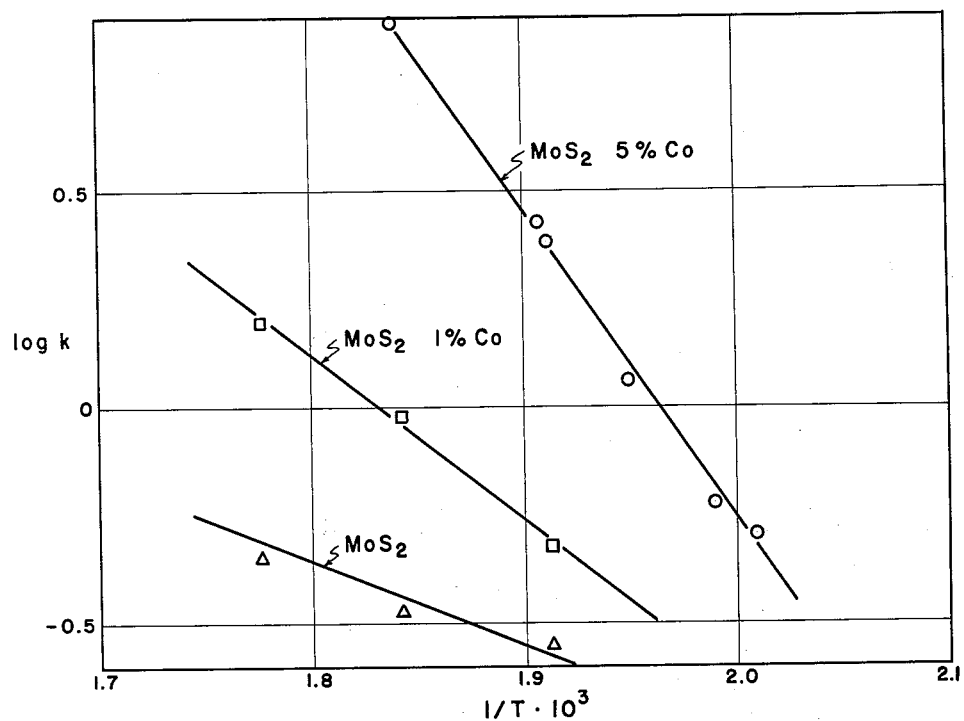
*INVENTOR.*
Lonnie W. Vernon,
James T. Richardson,
BY
*ATTORNEY*

United States Patent Office 3,000,816
Patented Sept. 19, 1961

1

3,000,816
DESULFURIZATION WITH A MODIFIED
MOLYBDENUM DISULFIDE CATALYST
Lonnie W. Vernon and James T. Richardson, Baytown, Tex., assignors, by mesne assignments, to Esso Research and Engineering Company, Elizabeth, N.J., a corporation of Delaware
Filed June 24, 1959, Ser. No. 822,651
10 Claims. (Cl. 208—216)

This invention relates to a new crystalline material. More particularly, this invention relates to a specially modified crystalline molybdenum disulfied characterized by a superior catalyst activity.

One of the problems which has received the serious attention of chemists almost since the initiation of chemical studies has been the removal of sulphur from organic compounds. It has been found that sulphur removal may be effected by reaction of sulphur compounds with hydrogen in the presence of a catalyst. A wide variety of materials has been investigated as catalysts for this reaction and, on a commercial scale, it has been found that good results are obtainable with supported metal oxide catalysts such as supported cobalt molybdate catalysts. However, in spite of the advances that have been made, it has not been possible to obtain as complete a removal of sulphur as is frequently desired without initiating deleterious side reactions.

A new crystalline material has been discovered in accordance with the present invention which is characterized by a superior catalytic activity with respect to the removal of sulphur from organic compounds.

This material may be characterized as a hexagonally crystalline molybdenum disulfide modified by having from 1 to 10 percent of the molybdenum atoms in the crystalline molybdenum disulfide replaced with atoms of lower altervalent metals such as iron, cobalt, nickel, copper, lithium, gallium, etc.

It is to be emphasized that the crystalline material of the present invention is one wherein the hexagonal crystalline structure of molybdenum disulfide is preserved even though altervalent metals are present in the crystal lattice. If the crystalline molybdenum disulfide structure is destroyed through the addition of an excess number of altervalent atoms, the beneficial catalytic activity will be materially impaired and the desired extent of sulphur removal will not be obtainable.

Inasmuch as it is desired to provide a material having a crystalline molybdenum disulfide structure, it is necessary to utilize special methods of preparation inasmuch as conventional techniques for catalyst preparation will not provide the desired crystalline structure.

Briefly, the crystalline material of the present invention is prepared by impregnating molybdenum trisulfide with an aqueous solution of a soluble compound of the altervalent metal in an amount such that the atomic ratio of the altervalent metal of the aqueous solution to the molybdenum of the molybdenum trisulfide is not more than 0.1 and is preferably within the range of about 0.03 to about 0.08. The thus treated molybdenum trisulfide is then dried and reduced with a gas containing hydrogen and a sulphur compound such as a hydrogen sulfide. For example, the reducing gas may comprise a mixture of about 90 to 99 volume percent of molecular hydrogen with about 10 to 1 volume percent of hydrogen sulfide.

2

The reduction step should be conducted under temperature and pressure conditions such that there is a simultaneous reduction of the molybdenum trisulfide to molybdenum disulfide and a replacement of from 1 to 10 percent of the molybdenum atoms of the molybdenite with the altervalent material. Briefly, the reduction step is conducted at about atmospheric pressure at a temperature above about 400° C. Under these conditions the hydrogen will effectively reduce the molybdenum trisulfide to molybdenum disulfide and at the same time, the hydrogen sulfide will inhibit further reduction of the molybdenum disulfide to metallic molybdenum. The desired result is not selectively obtainable at temperatures below about 400° C. A preferred temperature range is within the range of about 400° to about 600° C. Under the preferred temperature conditions, crystals are normally obtained having a surface area in excess of 20 square meters per gram. Thus, the surface area will generally be within the range of about 30 to 60 square meters per gram. At temperatures above 600° C., there is generally obtained a crystalline material of lower surface area.

The modified crystalline molybdenum disulfide formed in this fashion may be consolidated into a pill type of structure, especially when large scale commercial operations are contemplated. Conventional pilling techniques may be utilized when this is to be done.

For small scale operations such as laboratory operations, the pilling step is normally not necessary and may even be undesirable.

As has been indicated, the modified crystalline molybdenum disulfide of the present invention is characterized by superior activity as a catalyst for the hydrodesulfurization of organic sulphur compounds or mixtures of organic compounds. Thus, the material may be utilized to catalyze the hydrodesulfurization of thiophene type sulphur compounds, mercaptan type sulphur compounds, organic sulfides, etc. such as those found in petroleum hydrocarbons or fractions thereof such as naptha fractions, kerosene fractions, heating oil fractions, gas oil fractions, etc.

In general, the hydrodesulfurization conditions to be employed will be those normally used for the hydrodesulfurization of sulphur containing organic compounds. Thus, temperatures within the range of about 400° to about 1000° F., pressures within the range of about 0 to 1000 p.s.i.g., feed rates of about 0.1 to 10 v./v./hr., and hydrogen rates of about 100 to about 10,000 cubic feet of hydrogen per barrel of feed may be used. With gas oils, for example, temperatures may be within the range of about 600° to 800° F., pressures may be within the range of 200 to 1000 p.s.i.g., and space velocities may be within the range of 0.5 to 5 v./v./hr. The same general conditions may be used for the desulfurization of lubricating oil fractions. With lighter materials such as naphthas, reaction conditions may be the same as those set forth above except that it is generally preferable to use lower pressures of about 50 to 200 p.s.i.g.

The invention will be further illustrated by the following specific examples which are given by way of illustration and not as limitations on the scope of this invention.

PREPARATION OF CRYSTALLINE MATERIALS

*Example I*

A solution of ammonium molybdate in 6 normal ammonium hydroxide was prepared which contained about 30 weight percent of ammonium molybdate. Hydrogen sulfide was bubbled through the solution under ambient conditions to precipitate ammonium thiomolybdate. The ammonium thiomolybdate was then dried and redissolved in water. To the solution of ammonium thiomolybdate 3 normal sulfuric acid was added to precipitate molybdenum trisulfide. The molybdenum trisulfide was recovered, dried and reduced at 600° C. for 12 hours with a gas mixture containing 98 percent hydrogen and 2 percent hydrogen sulfide. X-ray examination showed this material to have the hexagonal molybdenum disulfide structure. It was a black, lustrous crystalline material with a surface area of 51 square meters per gram, having a magnetic susceptibility of $-0.59 \times 10^{-6}$ E.M.U. at 25° C., and a thermal E.M.F. of $18.10^{-6}$ volts per degree C. at 300° in one atmosphere of hydrogen.

*Example II*

Example I was repeated with the following exceptions in order to provide a modified molybdenum disulfide wherein 1 percent of the molybdenum atoms of the molybdenum disulfide were replaced with cobalt atoms.

$MoS_3$ was prepared as in Example I. The dried $MoS_3$ was impregnated with a solution of cobalt acetate so that the ratio of cobalt in the cobalt acetate solution to molybdenum atoms in the $MoS_3$ was 0.01. The impregnated $MoS_3$ was reduced by 600° C. for 12 hours with a gas mixture containing 98 percent hydrogen and 2 percent hydrogen sulfide. X-ray examination of this crystalline material showed it to have the hexagonal molybdenum disulfide structure. It was black, lustrous with a surface area of 53 square meters per gram, having a magnetic susceptibility of $-0.44 \cdot 10^{-6}$ E.M.U. at 25° C.

*Example III*

In order to prepare a composition wherein 5 percent of the molybdenum atoms of the molybdenum disulfide were replaced with cobalt, Example II was repeated with the exception that the cobalt acetate was employed in an amount sufficient to provide an atomic ratio of cobalt to molybdenum of 0.05. X-ray examination showed this material to have the hexagonal molybdenum disulfide structure. It was black and lustrous and had a surface of 35 square meters per gram, a magnetic susceptibility of $+1.54 \times 10^{-6}$ E.M.U. at 25° C., and a thermal E.M.F. of $100.10^{-6}$ volts per degree C. at 300° C. in one atmosphere of hydrogen.

*Example IV*

Example III was repeated on a larger scale. In this case, the modified molybdenum disulfide had a surface area of 52 square meters per gram. This material was formed into one-eighth inch diameter pills in a pilling machine.

SULPHUR REMOVAL STUDIES

In order to obtain precise measurements with respect to the ability of the materials in question to catalytically promote the rupture of carbon-sulfur bonds, standardized hydrodesulfurization conditions were utilized for the conversion of thiophene into butanes and butenes. The standardized conditions for the series of runs included atmospheric pressure and temperatures within the range of 225° to 350° C. In all instances the feed material consisted of a mixture of approximately 1 percent thiophene in hydrogen. This system was selected for study since it had previously been determined that the hydrodesulfurization of thiophene under these conditions proceeds by a pseudo-first-order mechanism wherein the rate constant is easily determined. The rate constant is of consequence for the studies under consideration inasmuch as it provides a positive measurement of the catalytic activity of the materials investigated.

In the first portion of this study, the catalysts of Examples I, II and III were utilized for the hydrodesulfurization of thiophene at 250° C. in replicate runs. In this study, a commercially available gamma alumina supported cobalt molybdate catalyst was also employed. The catalyst contained about 3 weight CoO and about 9 percent $MoO_3$ and had a surface area of approximately 160 square meters per gram. This catalyst was utilized as a reference material inasmuch as it was the most active catalyst on hand at the time of the study in question. The results are set forth below:

TABLE I

| Catalyst | Rate Constant, sec.$^{-1}$ | Relative Activity |
|---|---|---|
| $MoS_2$ | 0.28 | 280 |
| $MoS_2$+1% Co | 0.51 | 510 |
| $MoS_2$+5% Co | 2.50 | 2,500 |
| Commercial $CoMoO_4$–$Al_2O_3$ | 0.10 | 100 |

In another series of studies, the catalyst of Examples I, II and III were utilized at varying temperatures in order to obtain data with respect to rate constant. This information is set forth in the accompanying drawing.

*Example V*

The catalyst of Example IV identified as $MoS_2$+5 percent Co was utilized for the hydrodesulfurization of a West Texas gas oil feed stock having the following properties:

TABLE II.—GAS OIL FEED STOCK

| | |
|---|---|
| Gravity, ° API | 24.9 |
| Sulfur, wt. percent | 1.92 |
| Con. carbon, w. percent | 0.59 |
| Viscosity, 550/130° F | 68.1 |
| Pour, ° F | 65 |
| Refractive index, $nD$, 67° C | 1.4849 |
| Distillation (ASTM D-1160): | |
| 5% off at, ° F | 578 |
| 10% | 611 |
| 20% | 643 |
| 30% | 669 |
| 40% | 690 |
| 50% | 710 |
| 60% | 730 |
| 70% | 763 |
| 80% | 885 |
| 90% | 994 |
| 95% | 1029 |
| FBP | 1066 |

As a reference material, a commercially available gamma alumina-supported cobalt molybdate was used. This catalyst has the following composition: 12.4% $MoO_3$, 3.4% CoO, 278 M.²/g. surface area.

The hydrodesulfurization conditions that were employed included the following:

| | |
|---|---|
| Temperatures | 650°, 700°, 750° and 800° F. |
| Pressure | 80 p.s.i.g. |
| Feed rate | 2 v./v./hr. |
| Hydrogen | 500 s.c.f./barrel of oil. |

The results as obtained are set forth in the following table:

| Yield Period | Temp. | Percent Desulfurization | |
|---|---|---|---|
| | | $MoS_2$+5% Co | Comm. $CoMoO_4$–$Al_2O_3$ |
| 1 | 750 | 92 | 92 |
| 2 | 750 | 91 | 90 |
| 3 | 650 | 64 | 64 |
| 4 | 700 | 83 | 82 |
| 5 | 750 | 91 | 89 |
| 6 | 800 | 97 | |

What is claimed is:

1. A modified molybdenum disulfide comprising hexagonal crystalline molybdenum disulfide having from 1 to 10 percent of the molybdenum atoms of the crystalline molybdenum disulfide replaced with lower altervalent metal atoms.

2. A molybdenum disulfide as in claim 1 wherein the altervalent metal is cobalt.

3. A process for the desulfurization of a sulfur containing hydrocarbon feed stock which comprises contacting said feed stock in the presence of added hydrogen under hydrodesulfurization conditions with a modified molybdenum disulfide comprising hexagonal crystalline molybdenum disulfide having from 1 to 10 percent of the molybdenum atoms of the crystalline molybdenum disulfide replaced with lower altervalent metal atoms.

4. A method as in claim 3 wherein the altervalent metal is cobalt.

5. A process which comprises contacting a petroleum hydrocarbon feed stock under hydrodesulfurization conditions with a modified molybdenum disulfide comprising hexagonal crystalline molybdenum disulfide having from 1 to 10 percent of the molybdenum atoms of the crystalline molybdenum disulfide replaced with lower altervalent metal atoms, said hydrodesulfurization conditions including a temperature within the range of about 400° to 1000° F., pressure of a range of about 200 to 500 p.s.i.g., space velocity of about 0.5 to 10 v./v./hr., and a hydrogen charge rate of about 100 to about 10,000 cubic feet of hydrogen per barrel of feed stock.

6. A method for preparing modified molybdenum disulfide which comprises impregnating molybdenum trisulfide with an aqueous solution of a lower altervalent metal in an amount sufficient to provide an atomic ratio of said altervalent metal of the aqueous solution to the molybdenum of the molybdenum trisulfide not more than 0.1, drying said impregnated molybdenum trisulfide, and then reducing said dried impregnated molybdenum trisulfide with a reducing gas comprising 90 to 99 percent by volume of hydrogen and 10 to 1 percent by volume of hydrogen sulfide under reducing conditions at a temperature above about 400° C. to form modified molybdenum disulfide in which 1 to 10 percent of the molybdenum atoms are replaced by atoms of said lower altervalent metal.

7. A method in accordance with claim 6 in which the atomic ratio is within the range of about 0.03 to about 0.08.

8. A method in accordance with claim 6 in which the temperature is within the range of about 400° to about 600° C.

9. A method in accordance with claim 6 in which the altervalent metal is cobalt.

10. A method in accordance with claim 6 in which the solution is a solution of cobalt acetate.

References Cited in the file of this patent

UNITED STATES PATENTS

| | | |
|---|---|---|
| 2,037,791 | Ipatieff | Apr. 21, 1936 |
| 2,325,033 | Byrns | July 27, 1943 |
| 2,697,683 | Engel et al. | Dec. 21, 1954 |
| 2,761,817 | Sweetser | Sept. 4, 1956 |
| 2,799,661 | De Rosset | July 16, 1957 |
| 2,894,903 | McGrath et al. | July 14, 1959 |
| 2,905,636 | Watkins et al. | Sept. 22, 1959 |

OTHER REFERENCES

Dana et al.: "Manual of Mineralogy," p. 174, John Wiley & Sons, Inc., New York, 1941.